(12) United States Patent
Teague

(10) Patent No.: US 7,715,847 B2
(45) Date of Patent: May 11, 2010

(54) USE OF DECREMENTAL ASSIGNMENTS

(75) Inventor: Edward Harrison Teague, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 131 days.

(21) Appl. No.: 11/141,794

(22) Filed: May 31, 2005

(65) Prior Publication Data
US 2006/0205413 A1 Sep. 14, 2006

Related U.S. Application Data

(60) Provisional application No. 60/659,969, filed on Mar. 9, 2005.

(51) Int. Cl.
*H04Q 7/20* (2006.01)
(52) U.S. Cl. .................. 455/452.1; 455/450; 455/453; 455/464; 370/329; 370/341
(58) Field of Classification Search ............. 455/452.1, 455/450, 453, 464; 370/329, 341
See application file for complete search history.

(56) References Cited

U.S. PATENT DOCUMENTS

| | | | | |
|---|---|---|---|---|
| 5,867,789 | A * | 2/1999 | Olds et al. ................ | 455/453 |
| 6,449,765 | B1 * | 9/2002 | Ballard ....................... | 717/174 |
| 6,532,227 | B1 | 3/2003 | Leppisaari et al. | |
| 6,571,102 | B1 | 5/2003 | Hogberg et al. | |
| 6,597,680 | B1 | 7/2003 | Lindskog et al. | |
| 7,155,515 | B1 * | 12/2006 | Brown et al. ................ | 709/226 |
| 7,164,888 | B2 * | 1/2007 | Zerressen ................ | 455/67.11 |
| 7,221,945 | B2 * | 5/2007 | Milford et al. ........... | 455/452.1 |
| 2002/0016166 | A1 * | 2/2002 | Uchida et al. ............... | 455/419 |
| 2004/0213184 | A1 * | 10/2004 | Hu et al. ..................... | 370/335 |
| 2005/0049013 | A1 * | 3/2005 | Chang et al. ................ | 455/574 |

FOREIGN PATENT DOCUMENTS

| | | |
|---|---|---|
| WO | 9859441 | 12/1998 |
| WO | 03034758 | 4/2003 |
| WO | 06069320 | 6/2006 |

OTHER PUBLICATIONS

International Search Report PCT/US06/008299—International Search Authority—European Patent Office Jul. 28, 2006.
Written Opinion, PCT/2006/008299, The International Searching Authority, European Patent Office, Jul. 28, 2006.
International Preliminary Report on Patentability, PCT/2006/008299, The International Bureau of WIPO, Geneva, Switzerland, Sep. 12, 2007.

* cited by examiner

*Primary Examiner*—Nghi H Ly
(74) *Attorney, Agent, or Firm*—Milan I. Patel

(57) ABSTRACT

Systems and methods are disclosed that facilitate dynamically assigning system resources in a wireless network environment by detecting a resource conflict between an existing resource assignment to one or more existing user devices and a new resource assignment for a subsequent user device. Upon detection of a conflict, a decremental assignment can be provided to the one ore more existing user devices to decrement the existing resource assignment in order to resolve a detected resource conflict. Decremental assignments can be implicit or explicit, and can facilitate mitigating transmission overhead costs due to their relatively small size when compared to conventional complete deassignment/reassignment messages.

51 Claims, 13 Drawing Sheets

USE OF DECREMENTAL ASSIGNMENTS

CLAIM OF PRIORITY UNDER 35 U.S.C. §119

The present Application for Patent claims priority to Provisional Application No. 60/659,969 entitled "USE OF DECREMENTAL ASSIGNMENTS" filed Mar. 9, 2005, and assigned to the assignee hereof and hereby expressly incorporated by reference herein.

BACKGROUND

I. Field

The following description relates generally to wireless communications, and more particularly to providing decremental resource assignments that facilitate reducing assignment message size.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

For example, it can be expensive (e.g., bit-wise, . . . ) to precisely describe channel assignments in a wireless networking environment. Such can be especially true when users (e.g., mobile devices) are not required to be aware of system resource assignments to other users of the wireless system. In such cases, assignments of system resources, such as broadcast channels an the like can require updating on virtually every broadcast cycle in order to provide each user with adequate bandwidth and/or networking power, which can tax the wireless network system and expedite realization of network limitations. Additionally, by requiring such continuous updates and/or complete reassignment messages to be transmitted to users so frequently, such conventional methods of system resource allocation can require expensive and high-powered communication components (e.g., transceivers, processors, . . . ) just to meet system demand.

Multiple-access communication systems typically employ methods of assigning system resources to the individual users of the system. When such assignments change rapidly over time, system overhead required just to manage the assignments can become a significant portion of the overall system capacity. In a system where assignments are "sticky" (e.g., an assignment persists over time rather than having a deterministic expiration time), assignment of resources to a first user of resources in use by a second user can require deassignment of resources from the second user, which can cause conflicts and potential complex reassignment issues in the event that it is desired that certain of the deassigned resources remain assigned to the second user, etc.

In view of at least the above, there exists a need in the art for a system and/or methodology of improving assignment notification and/or updates and reducing assignment message overhead in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

One or more embodiments include a plurality of systems/methodologies for resolving resource assignment conflicts using decremental assignments in wireless networking environments (e.g., OFDM, OFDMA, CDMA, . . . ). A decremental assignment can be implicit or explicit. For example, an explicit decremental assignment can specify a portion of a user's existing assignment that should be removed from the user's assignment, while an implicit decremental assignment can be an assignment to another user that is observed by the first user and conflicts with the first user's assignment. In the latter case, such a conflicting assignment message to a second user can be interpreted by the first user as a decremental assignment. Decremental assignments provide more robust resource management mechanisms than conventional systems, which typically employ a complete explicit deassignment of resources that removes all of a user's resource assignments where conflicting assignments are discovered.

The utilization of decremental assignments facilitates permitting a network to reduce assignment message overhead by transmitting a single assignment that simultaneously deassigns a portion of resources assigned to a conflicting user and assigns such resources to an intended user. Decremental assignment messages can be transmitted in a manner such that the assignment message is decodable by all current users affected by the deassignment (e.g., all users whose present resource assignment is in conflict with resources being assigned by a new assignment message, as well as the intended recipient of the resources). Additionally, when assignment messages are limited in the number of resource subsets that can be defined, decremental assignments can facilitate alleviating assignment restrictions due to existing assignments to other users. For example, overlaps between user assignments can be construed as an implicit decremental assignment to a current assignee of a resource in favor of reassignment of the overlapping resource(s) to a new intended user.

In accordance with another aspect, a method of dynamically assigning and reassigning system resources in a wireless network environment can comprise detecting a resource conflict between an existing resource assignment to a first user device and a new resource assignment for a second user device, and providing a decremental assignment to the first user device to decrement the existing resource assignment to resolve a detected resource conflict. Detecting a resource conflict can comprise comparing the new resource assignment to all existing resource assignments to determine at least one conflicting resource listed in both the new resource assignment and the existing resource assignment.

In another aspect, a method of dynamically allocating wireless network resources can comprise generating a first resource assignment for a first user device connected to a wireless network, transmitting the first standard assignment to the first user device to give the first user control of resources defined in the first standard resource assignment, generating a second standard resource assignment for a second user device connected to the wireless network, and determining whether at least one resource is common to each of the first and second standard assignments prior to transmitting the second assignment to the second user device. Upon a determination that at least one common resource assignment exists, the method can further comprise decrementing the at least one common resource from the first standard resource assignment, and assigning the at least one decremented resource to the second user device in the second standard resource assignment. Additionally, the first user device can automatically remove the commonly assigned resource from its assignment upon reading the second standard assignment, which acts as an implicit decremental assignment of the at least one commonly assigned resource for the first user device.

According to still another aspect, a wireless network resource allocation apparatus can include means for detecting conflicting standard resource assignments that define at least one common resource, means for generating a decremental assignment that resolves detected conflicts between resource assignments, and means for distinguishing the decremental resource assignment from standard resource assignments. Additionally, the apparatus can comprise means for verifying receipt of an assignment message by a user device, such as an indication of receipt of successful assignment decode over a reverse link and/or an acknowledgement of a successful assignment decode over a forward link to indicate successful receipt of a standard resource assignment.

In yet another aspect, a system that facilitates dynamic resource assignment system can comprise an assignment component that generates persistent resource assignments for user devices in a wireless network environment and detects conflicts between resource assignments, a transmitter that transmits resource assignments to user devices, and a decremental assignment component that generates decremental assignments for at least one user device to resolve conflicts between assignments detected by the assignment component. The system can additionally comprise a verification component that receives a verification message from a user device that has received a resource assignment, wherein the verification message can indicate a successful receipt of the assignment message.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
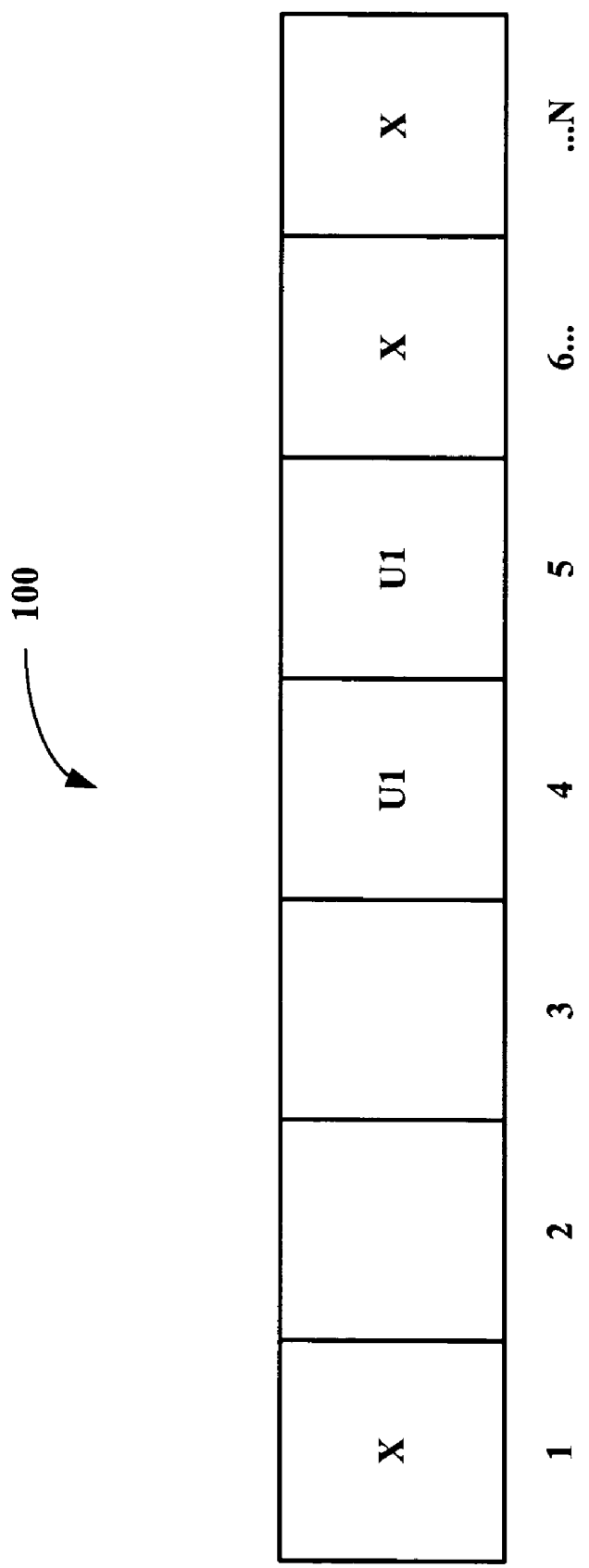
FIG. 1 illustrates a group of N system resource blocks in order to facilitate understanding of a manner in which various embodiments presented herein can operate.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In accordance with one or more embodiments and corresponding disclosure thereof, various aspects are described in connection with managing system resources (e.g., channels, frequencies, time slots, . . . ) and satisfying user needs in a wireless network environment. According to one aspect, decremental assignments can be employed to subtract from, rather than completely remove or deassign, "sticky" assignments (e.g., assignments that are valid until a next assignment signal is received). The described decremental assignments can facilitate fine-tuned system resource management, particularly with regard to instantaneously available system resources, as well as providing a more robust user experience at reduced overhead cost than can be achieved by conventional systems and/or methodologies.

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a group of N system resource blocks 100 in order to facilitate understanding of a manner in which various embodiments presented herein can operate. Such resource blocks 100 can represent, for instance, transmission channels, time slots, frequencies, code slots, a combination of the preceding, etc. A general description of a subset of such blocks can be, for example, a block index list, such as a list of blocks assigned to a particular user. For example, an index list such as {2, 3, 10, 11, 12, 13} could be employed to represent that the user is assigned such blocks. Alternatively, a Boolean array can be employed to describe the same assignment, such as an array of n bits {01100000011110}. Conventional systems employing such assignment mechanisms will realize significant expense in doing so, albeit with different properties. For instance, a block index list can be substantially more expensive with regard to a number of bits required to convey such assignments as a subset of blocks to be assigned grows in size. The Boolean array, on the other hand, exhibits a somewhat fixed expense regardless of the number of 1s and 0s, but the expense is relatively large, especially as n grows.

Additionally, in cases where assignments are restricted to contiguous sets of blocks, or resources, such assignments can be signaled by indicating a first block in the assignment and a total number of blocks in the assignment. For example, a block index assignment such as {11, 12, 13, 14, 15} can be signaled as {11, 5}, where "11" represents a first block to be assigned to a given user and "5" represents the total number of contiguous blocks to be assigned, of which 11 is the first block. Still furthermore, if an ordering of users is known, then an assignment signal can be transmitted without user information. For instance, only the number of blocks being assigned need be signaled so long as all users are aware of the assignments for all other users.

According to an embodiment, decremental assignments can be generated and/or employed to facilitate resource block management. A decremental assignment can be implicit or explicit. For instance, an explicit decremental assignment can specify a portion of a user's existing assignment that should be removed from the user's assignment, while an implicit decremental assignment can be an assignment to another user that is observed by the first user and conflicts with the first user's assignment. In the latter case, such a conflicting assignment message to a second user can be interpreted by the first user as a decremental assignment. Both types of decremental assignments provide more robust resource management mechanisms than conventional systems, which typically employ a complete explicit deassignment of resources that removes all of a user's resource assignments.

The utilization of decremental assignments facilitates permitting a network to reduce assignment message overhead by transmitting a single assignment that simultaneously deassigns resources or conflicting users and assigns such resources to an intended user. Decremental assignment messages can be transmitted in a manner such that the assignment message is decodable by all current users affected by the deassignment (e.g., all users whose present resource assignment is in conflict with resources being assigned by a newly generated assignment, as well as the intended recipient of the assignment). Additionally, when assignment messages are limited in the number of resource subsets that can be defined, decremental assignments can facilitate alleviating assignment restrictions due to existing assignments to other users. For example, overlaps between user assignments can be construed as an implicit decremental assignment to a current assignee of a resource in favor of reassignment of the overlapping resource to a new intended user.

By way of example, the group of blocks 100 can be apportioned to a plurality of users during an initial assignment. For instance, a first user U1 can be assigned resource blocks 4 and 5, and various other users can be assigned resource blocks 1, and 6 through N. If it is determined that a second user U2 requires three resource blocks, and if U1 is determined to be an acceptable resource donor, then a decremental assignment can be transmitted that is decodable by U1 and U2, such as [2,3:0]. The preceding example of a decremental assignment can assign three contiguous resource blocks to U2, starting with the second block in the set of all blocks 1-N. It will be noted that the three-block-long contiguous set of resource blocks comprises block 4, which is assigned to U1. However, U1 is also able to decode the subject assignment message, which can be interpreted as an implicit decremental assignment for U1. Thus, upon transmission of the single assignment message, the portion of U1's resource assignment that is in conflict with the assignment to U2 can be deassigned (e.g., decremented) without deassigning all of U1's resource subset. In this case, resource block 4 will be decremented from U1's resource assignment set and will be reassigned to U2, while U1 retains an assignment for block 5.

Figure 2:
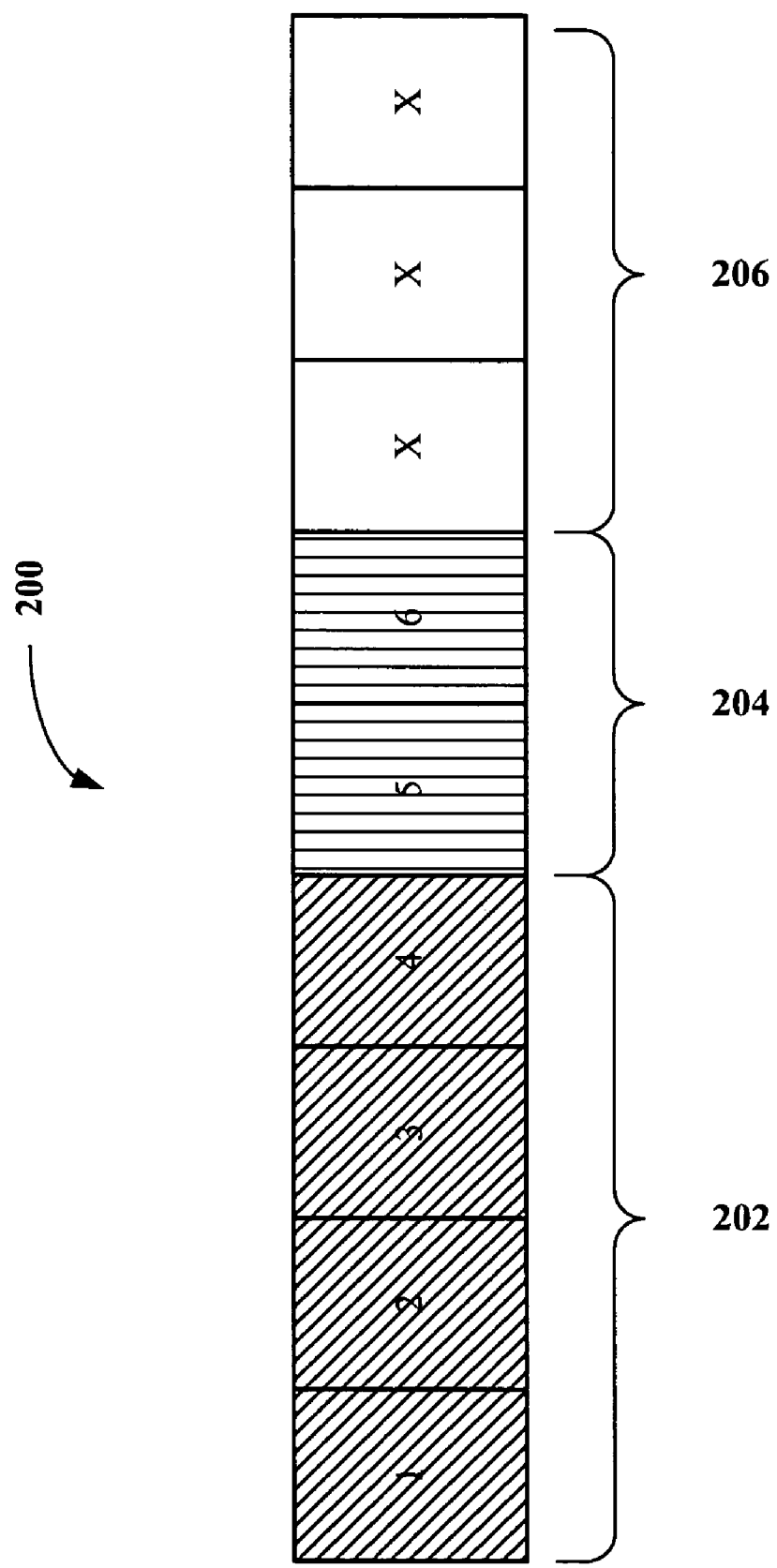
FIG. 2 illustrates a group of resource blocks that can be allocated to a plurality of users, any of which can have an associated assignment subset decremented upon a conflicting resource assignment.

FIG. 2 illustrates a group of resource blocks 200 that can be allocated to a plurality of users, any of which can have an associated assignment subset decremented upon a conflicting resource assignment. Such resources can include, for example, system channels, time slots, frequencies, code slots, and the like. According to an embodiment, sticky assignments (e.g., assignments that are valid until a further assignment signal is received) can be employed to assign system resources in, for example, wireless communication networks (e.g., OFDM, OFDMA, CDMA, TDMA, GSM, . . . ). Such assignments can also be restrictive, such that signal expense is reduced at a cost of limiting ability to arbitrarily assign sets of resource blocks. In order to overcome such restrictions while minimizing allocation signal expense, decremental assignments can be employed to manage system resources and meet user resource needs. For example, the resource blocks 200 can comprise a first block set 202 that contains blocks 1-4 that are assigned to user 1. User 2 can be assigned a second block set 204 that comprises blocks 5 and 6. Finally, blocks 7-9 can comprise a remaining block set 206 that consists of a of occupied (e.g., assigned) resource blocks. It can be determined that the requirements of user 2 have increased to a point that user 2 requires additional resource blocks. According to this aspect, a decremental assignment can be generated that can facilitate freeing resources for user 2's current assignment set 204 at the partial expense of user 1's assigned resource set 202, rather than completely deassigning user 1's resource set 202.

For example, user 1's initial sticky assignment can be represented as {1, 2, 3, 4:0}, where channels 1-4 are assigned. Additionally, to mitigate signal transmission expense in cases where assigned channels are contiguous, such an assignment can be represented as [1,4:0] where the first integer "1" represents a first assigned channel, and the second integer "4" represents a length of assigned channels. If additional channels are to be assigned to user 2, for instance, due to increased user needs and the like, then a decremental assignment can be generated and transmitted to user 1 and to user 2. For example, {user 2; 4,3} can represent that resource blocks 4 through 6 are to be assigned to user 2. The assignment message can be decoded by user 1 as well, which can result in detection of a conflicting assignment for resource block 4. The result of the conflict can be that user 1's resource assignment set is decrement by one (e.g., block 4 is deassigned) while user 1 retains an assignment to blocks 1-3, which is in contrast to conventional systems that require complete deassignment of all resources to a user upon detection of an assignment conflict for any portion of the user's assignment. Thus, the conflict can be resolved in favor of user 2's device, which requires and/or has requested additional resource assignment(s).

According to a related aspect, decremental assignment transmission permissions can be predicated upon validation of a previous assignment to a user (e.g., reception of some validating data, such as an indication of a successful packet or sequence decode over a reverse link, an acknowledgement over a forward link, . . . ). In such a manner, a network can validate a user's assignment prior to decrementing such assignment.

Figure 3:
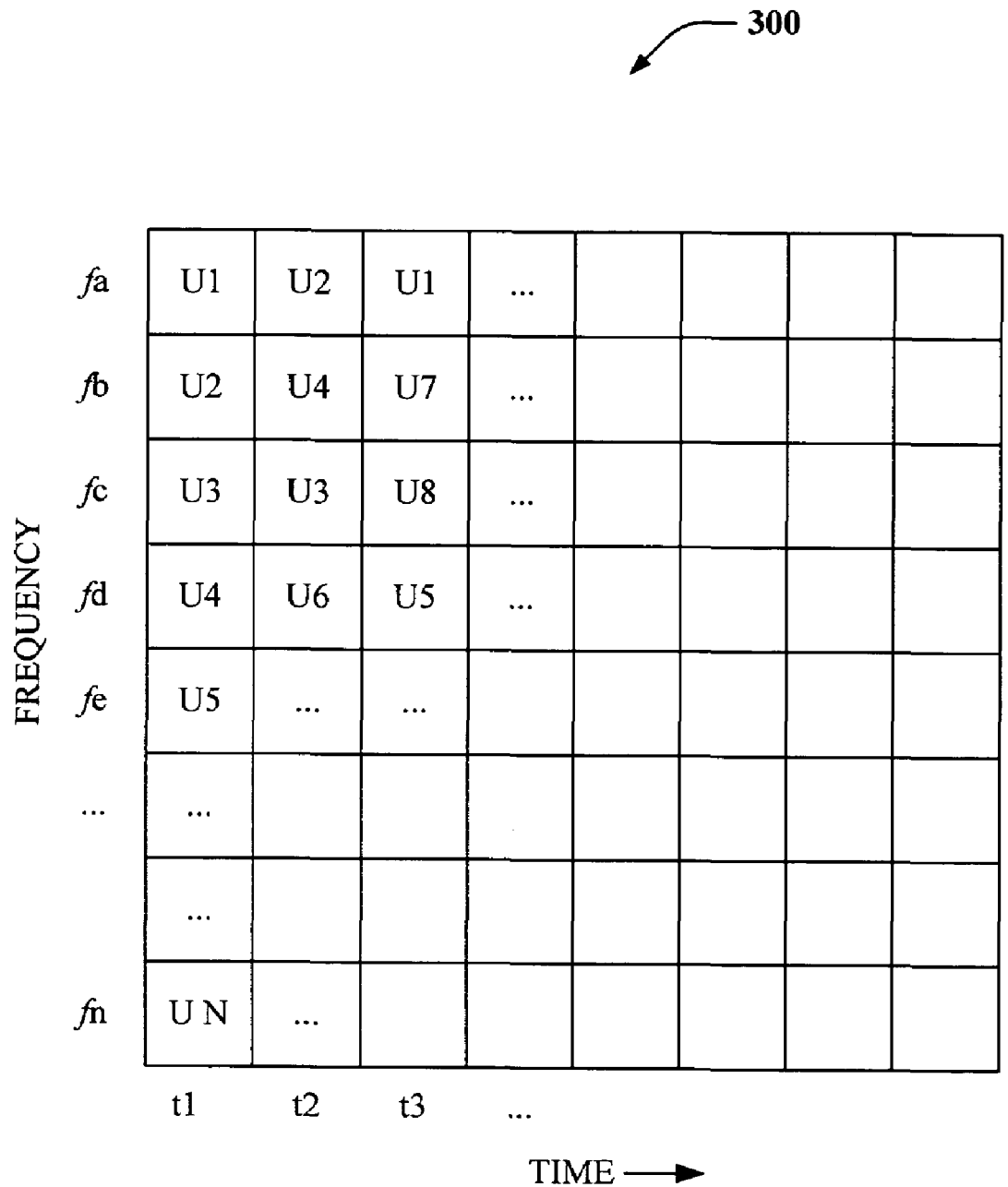
FIG. 3 is an illustration of a series of non-persistent (e.g., non-sticky) assignments made over time.

FIG. 3 is an illustration of a series of non-persistent (e.g., non-sticky) assignments made over time. Frequencies are illustrated as the type of system resource being assigned, although assignable system resources are not limited to being such. According to the figure, a first user, U1, is assigned frequency A at time 1. At time 2, frequency A can be reassigned to user 2, in part because the initial assignment is not a sticky assignment. Frequency C is illustrated as being assigned to user 3 during both time 1 and time 2. However, because the assignment of frequency C to user 3 is not a sticky assignment, user 3's retention of frequency C can require separate assignments at each of time 1 and time 2, resulting in undesirable increases in assignment signal overhead, which in turn can detrimentally affect system resources. Thus, a system employing non-sticky assignments would require n different assignment messages per time frame to assign n available frequencies to N users.

Figure 4:
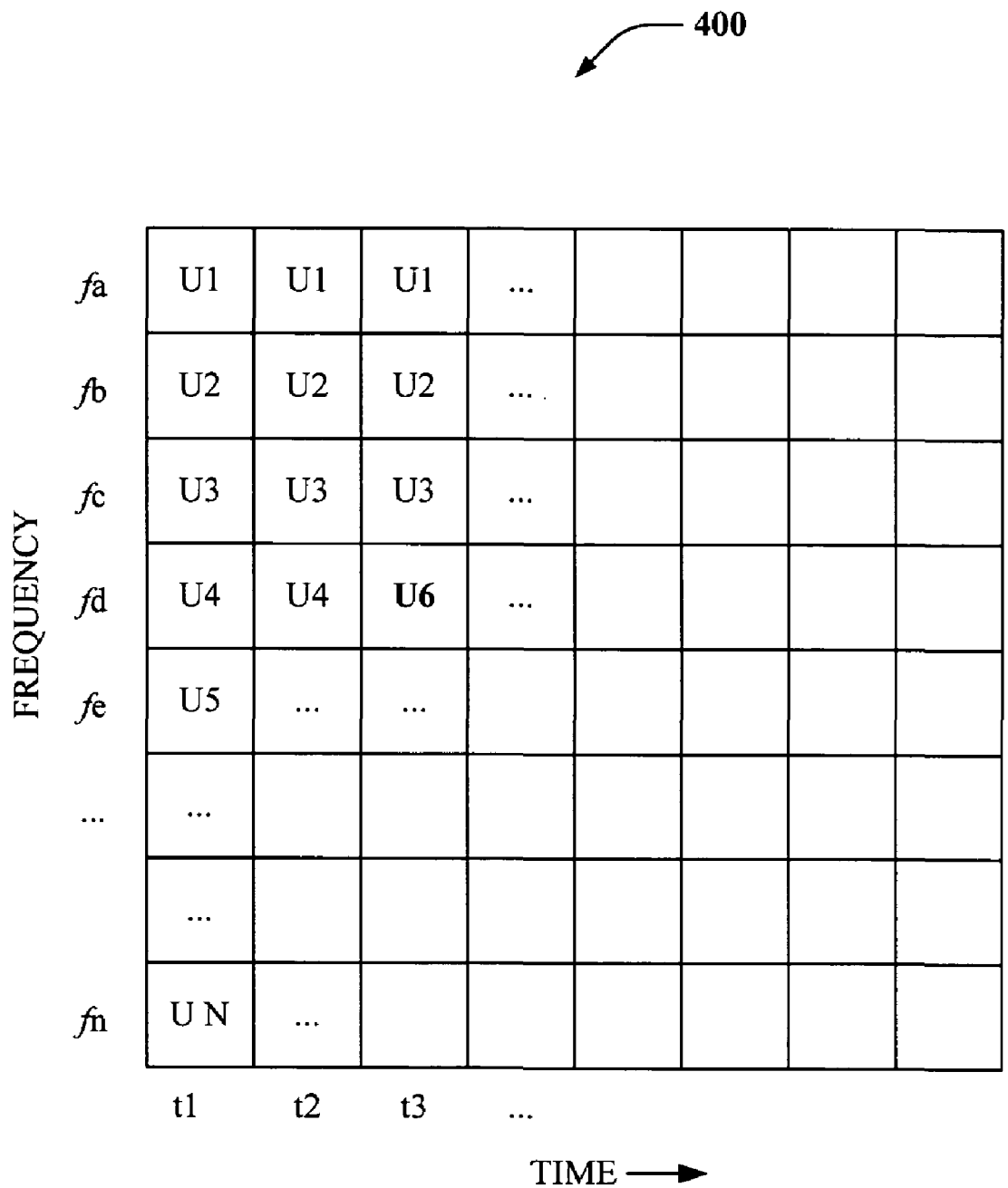
FIG. 4 is an illustration of a series of persistent, or "sticky" assignments made over time, such as can be employed with regard to various embodiments described herein.

FIG. 4 is an illustration of a series of persistent, or "sticky" assignments made over time, such as can be employed with regard to various embodiments described herein. For example, a first set of assignments can be transmitted to users 1-N during a first time frame, and such assignments can persist until one or more subsequent assignments are transmitted to one or more individual users. Thus, the first set of N assignments can suffice to provide system resource assignments to all users until a change in such assignments is desired and/or necessary (e.g., due to user needs, bandwidth availability, . . . ). A subsequent user such as U6 can be assigned frequency D should such frequency become necessary to U6, and, where the assignment of frequency D conflicts with a previous assignment to U4, frequency D can be deassigned from U4 in favor of assignment to U6, as illustrated at t3. In this manner, fewer assignment messages need be transmitted over a network than when employing non-sticky assignments.

Additionally, system resources can be assigned to any user 1-N should the user require additional resources. For instance, it can be determined that U5 requires additional frequency availability at some time during communication over a network, in addition to frequency E. A subsequent assignment message can be transmitted to U5 to indicate that frequencies E and F are assigned U5. Moreover, in connection with the various embodiments detailed herein, such additional assignment message can be an implicit decremental assignment that can be detected and decoded by a user whose assignment set is contradicted by the new assignment to U5. In this manner, a single message can suffice to reassign one or more resources to a user while deassigning the one or more resources from another user, which in turn can facilitate mitigating consumption of network resources when reassigning resources.

Figure 5:
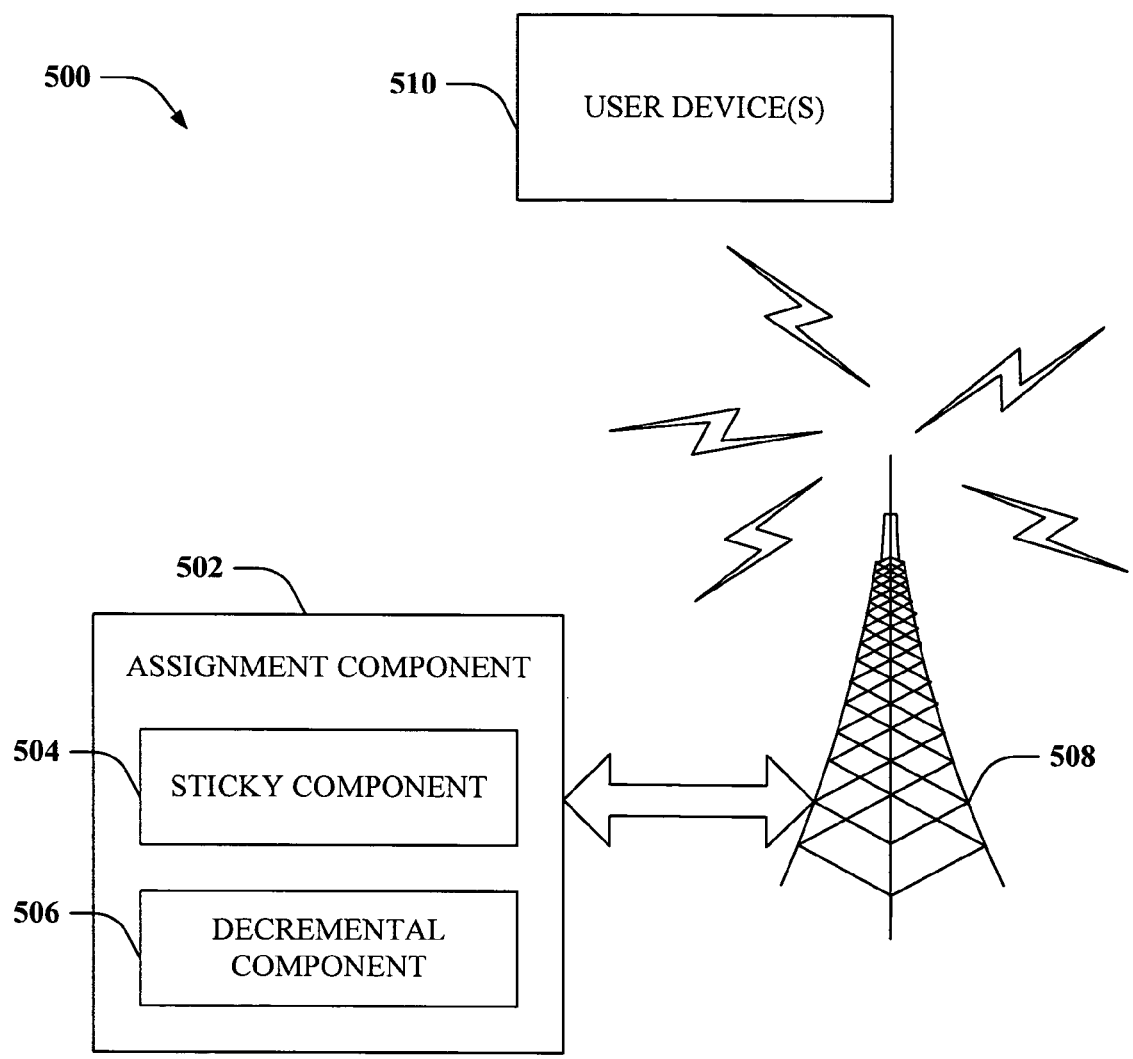
FIG. 5 is an illustration of a system that facilitates employing decremental assignments to dynamically allocate system resources in a manner that reduces system overhead and/or transmission requirements by reducing a number of messages required for resource reallocation and permitting partial deassignment of resource subsets.

FIG. 5 is an illustration of a system 500 that facilitates employing decremental assignments to dynamically allocate system resources in a manner that reduces system overhead and/or transmission requirements by reducing a number of messages required for resource reallocation and permitting partial deassignment of resource subsets. System 500 can comprise an assignment component 502 that controls system resource (e.g., channel, frequency, time slot, code slot, . . . ) allocation. Assignment component 502 comprises a sticky component 504 that generates sticky assignments that can be persisted in time until subsequent assignment information is received by a user (e.g., device). Assignment component 502 additionally comprises a decremental component 506 that generates decremental assignments to apportion system resources according to user needs as they change. For example, decremental component 506 can generate one or more decremental channel assignments to accommodate one or more users whose channel requirements have changed during a communication event. Such assignments can be transmitted through one or more base stations 508 to the one or more users' receiving devices 510.

According to an example, a user can be initially assigned a subset of available resources, such as {1, 3, 4:0}, where after it can be determined that the user requires additional resources. According to an embodiment, a decremental assignment [1, 4:0] can be generated and transmitted to the user to assign resources beginning with block 1 and having a length of 4 (e.g., channels 1-4). Thus, the new assignment can comprise channels 1, 3, and 4 as originally assigned to the user, as well as newly assigned channel 2. In the event that channel 2 is assigned to another user at the time of assignment to the first user, then the conflict can be detected by the network and resolved in favor of the newly assigned user. The user device to which channel 2 is assigned at the time of the new transmission can be identified and alerted as to the reassignment, and can automatically have its assignment decremented (e.g., channel 2 can be removed from the conflicting user device's assignment set). In this manner, the system 500 need not transmit a separate deassignment message to the conflicting user, thereby reducing overhead costs on the network.

Figure 6:
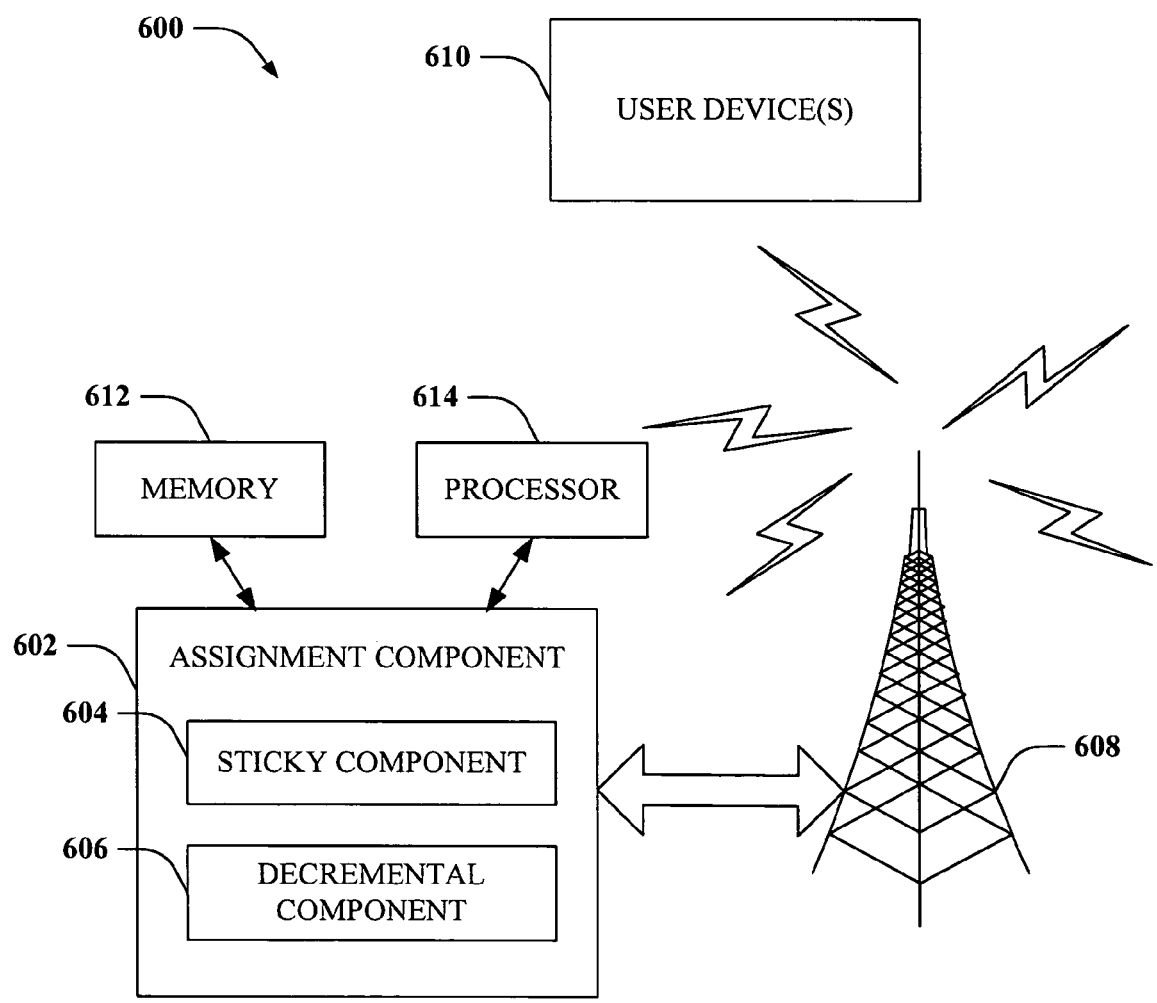
FIG. 6 illustrates a system that facilitates providing supplemental resource assignments to users of a communication network in order to reduce assignment signal overhead cost.

FIG. 6 illustrates a system 600 that facilitates providing supplemental resource assignments to users of a communication network in order to reduce assignment signal overhead cost. System 600 comprises an assignment component 602 that can generate resource assignments for users (e.g., recipient devices, . . . ). Assignment component 602 can comprise a sticky component 604 that can selectively generate sticky (e.g., persistent) assignments for users, wherein such assignments are maintained until a subsequent assignment signal resets the user's resource assignments. Assignment component 602 can generate non-sticky assignments if desired, while the use of sticky assignments can facilitate reducing system overhead by mitigating the number of assignment messages required to allocate resources to users of the network. Once assignments have been assigned to users of the network by assignment component 602 and/or sticky component 604, a decremental component 606 can generate additional assignments as need to allocate additional resources to one or more users. Such assignments can allocate resources based on need, and can be interpreted by a user device 610 receiving the additional resource assignment as well as by a user device 610 whose resource assignment is in conflict with the new assignment. Upon detecting the new assignment message, the conflicting user device can automatically relinquish its assignment to the resource, thereby having its resource assignment list decremented. Thus, where conventional systems would require a separate assignment to the conflicting user device, system 600 can generate a decremental assignment as detailed herein for transmission by one or more base stations 608 to at least two conflicting devices 610.

System 600 can additionally comprise memory 612 that is operatively coupled to assignment component 602 and that stores information related to user devices 610, system resources, assignments thereof, assignment conflicts, and any other suitable information related to providing dynamic allocation of system resources (e.g., channels, frequencies, time slots, code slots, . . . ) to one or more user devices 610. A processor 614 can be operatively connected to assignment component 602 (and/or memory 612) to facilitate analysis of information related to generating resource assignments, decrementing assignments based at least in part on detected conflicts, and the like. It is to be appreciated that processor 614 can be a processor dedicated to analyzing and/or generating information received by assignment component 602, a processor that controls one or more components of system 600, and/or a processor that both analyzes and generates information received by assignment component 602 and controls one or more components of system 600.

Memory 612 can additionally store protocols associated with generating and/or decrementing assignments, etc., such that system 600 can employ stored protocols and/or algorithms to achieve decremental assignment of system resources as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 612 of the subject systems and methods is intended to comprise, without being limited to, these and any other suitable types of memory.

Figure 7:
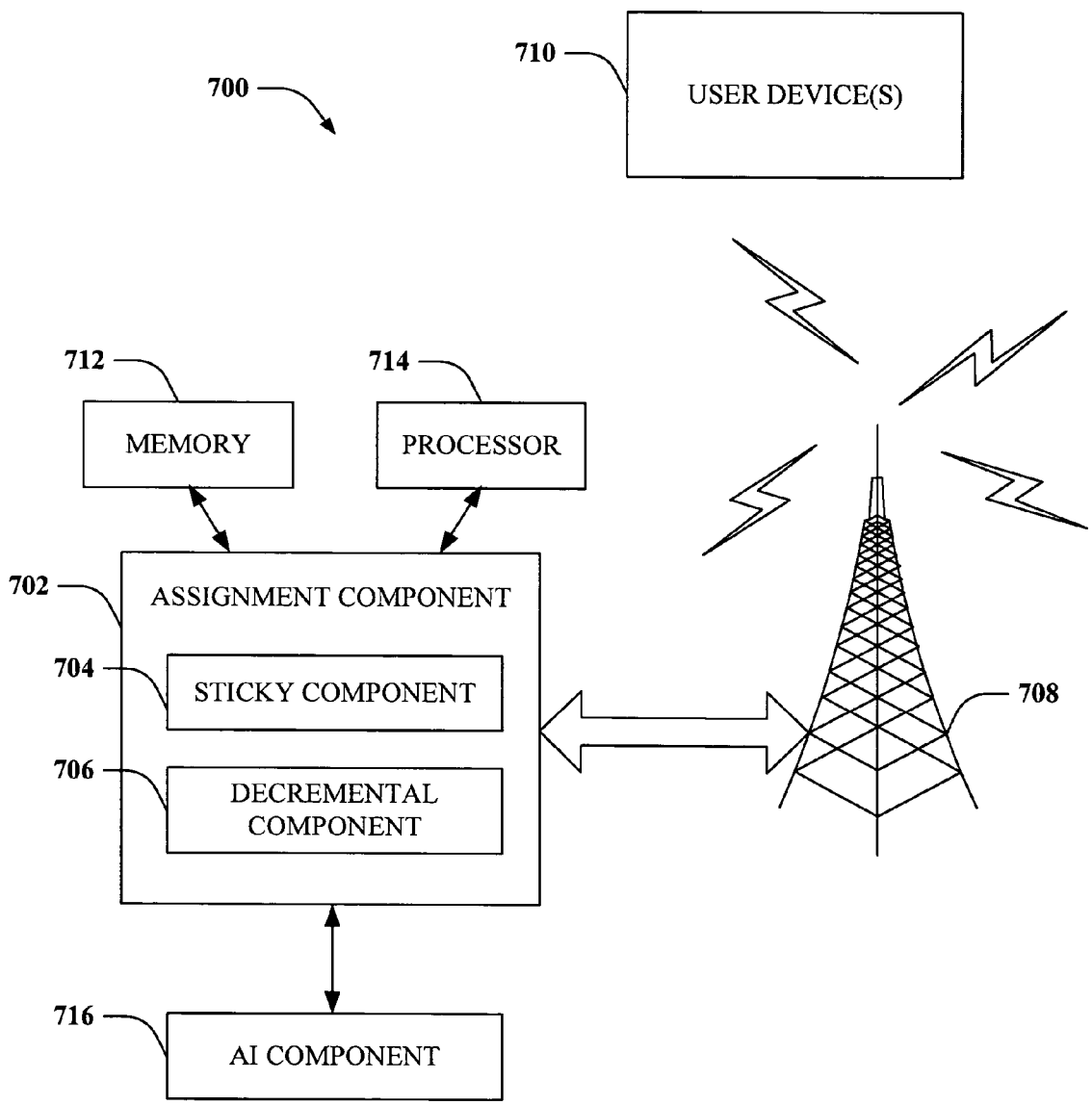
FIG. 7 is an illustration of a system that facilitates generating supplemental assignments to assign system resources to users of a communication network while mitigating resource allocation costs.

FIG. 7 is an illustration of a system 700 that facilitates generating supplemental assignments to assign system resources to users of a communication network while mitigating resource allocation costs. System 700 comprises an assignment component 702 that generates resource assignment signals for transmission through one or more base stations 708 to one or more network users' receiving devices 710. Such assignments can by non-sticky (e.g., generated during each time frame), if desired. Assignment component 702 comprises a sticky component 704 that generates sticky, or persistent, assignments for devices 710, where such resource assignments are persisted for the user's device 710 until a subsequent assignment message is transmitted to the particular user. By transmitting persistent assignments, sticky component 704 can facilitate reducing a number of assignment messages that need to be sent to users of a network. In order to further reduce transmission costs and assignment message size, assignment component 702 can comprise a decremental component 706 that generates decremental assignment messages as described with regard to the preceding figures.

For example, the initial sticky assignments generated by sticky component 704 can be delivered only to intended users. A subsequent sticky assignment to a first user can comprise a resource assignment that conflicts with a second user's previously assigned resource set. Decremental component 706 can determine the identity of the second user and can ensure that the new assignment being transmitted to the first user (e.g., the conflicting assignment) is viewable to the second user. Upon detecting the conflicting assignment, the second user can be automatically decremented (e.g., the second user relinquishes its assignment to the conflicted resource) in order to resolve the conflict in favor of the user to which the resource is most recently assigned.

System 700 can additionally comprises a memory 712 and a processor 714 as detailed above with regard to FIG. 6. Moreover, an AI component 716 can be operatively associated with assignment component 702 and can make inferences regarding resource allocation in view of overhead cost considerations, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, AI component 716 can infer an appropriate decremental assignment recipient based at least in part on, for instance, detected conflicting assignments. According to this example, it can be determined that a first user requires three additional system resource blocks, such as transmission channels and the like. AI component 716, in conjunction with processor 714 and/or memory 712, can determine that such resource blocks are limited and/or occupied by other users. AI component 716 can make inferences regarding a cost-benefit analysis with regard to, for example, selection of a particular user device deassignment candidate from a group of potential candidates. For instance, second and third users can both have resource assignments suitable for reassignment to user 1, but the third user requires substantially more power to receive messages (e.g., due to a larger distance from a base station 708, poorer quality of the receiving device, . . . ). In such a case, AI component 716 can facilitate selection of the second user because transmission costs are cheaper and the second user possesses a suitable resource assignment. Based at least in part on such inferences, decremental component 706 can identify the second user as the user to be decremented and can ensure that the conflicting assignment to the first user device is viewable by the second user device. Upon notification of the conflicting assignment to the first user device, the second user device can automatically have its assignment list decremented accordingly.

According to another example, AI component 716 can make inferences regarding whether or not to completely deassign a conflicting user's assignments upon transmission of a conflicting assignment message to another user. For instance, a threshold percentage of assignment conflict can be defined and employed as a benchmark by which to test conflicting assignments. If a first user is assigned five transmission channels and a second user is issued an assignment message that conflicts with three of the first user's assigned transmission channels, AI component 716 can infer that complete deassignment of the first user's resources is preferential to decremental assignment. Such can facilitate making resources available when resource allocation has reached a saturation point. The conflict threshold percentage can be predefined and or can be redefined during network operation as resource availability dictates.

Figure 8:
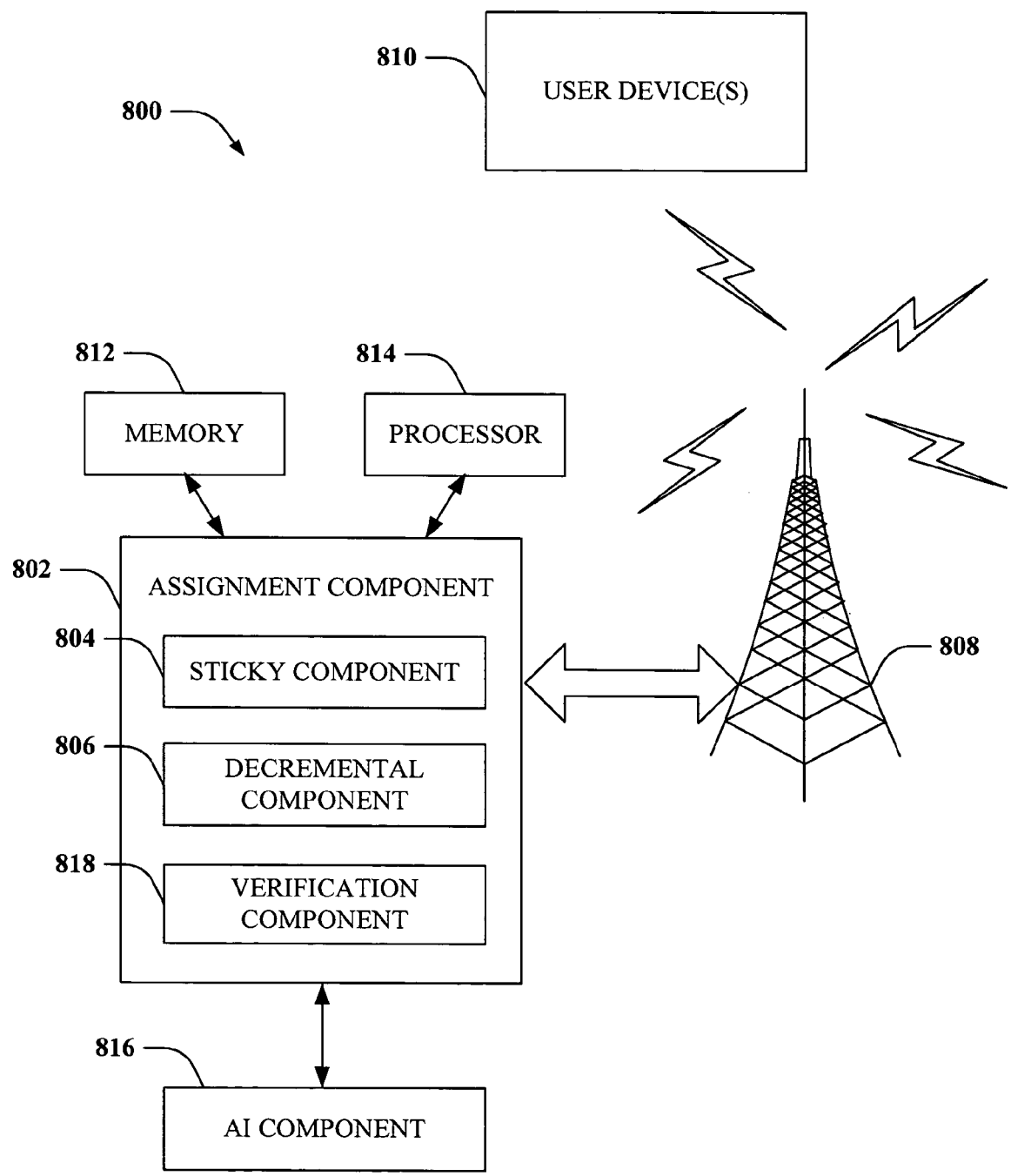
FIG. 8 illustrates a system that facilitates assigning system resources and reassignment of resources after validation of one or more initial assignments.

FIG. 8 illustrates a system 800 that facilitates assigning system resources and reassignment of resources after validation of one or more initial assignments. System 800 comprises an assignment component 802 that can assign resources, such as frequencies, channels, transmission time slots, etc., to one or more receiving devices 810 by way of one or more base stations 808 in a communications network. Assignment component 802 can comprise a sticky component 804 that provides persistent assignments and a decremental component 806 identifies conflicting resource assignments and ensures that all users having conflicting assignments can view the resource assignment causing the conflict, as described herein with regard to preceding figures. Assignment component 802 is additionally operatively coupled to each of a memory 812, a processor 814, and an AI component 816, each of which can in turn be operatively coupled to the other.

The assignment component 802 can additionally comprise a verification component 818 that receives validation data from one or more user devices 810 via one or more base stations 808. According to this scenario, user devices 810 can comprise transceiving functionality in order to transmit validation information back to assignment component 802. Such validation data can be, for instance, an indication of a successful packet or sequence decode over a reverse link, an acknowledgement (ACK) over a forward link, and the like. In this manner, system 800 can validate an assignment to a user prior to decrementing the assignment with a signal generated by decremental component 806.

Figure 9:
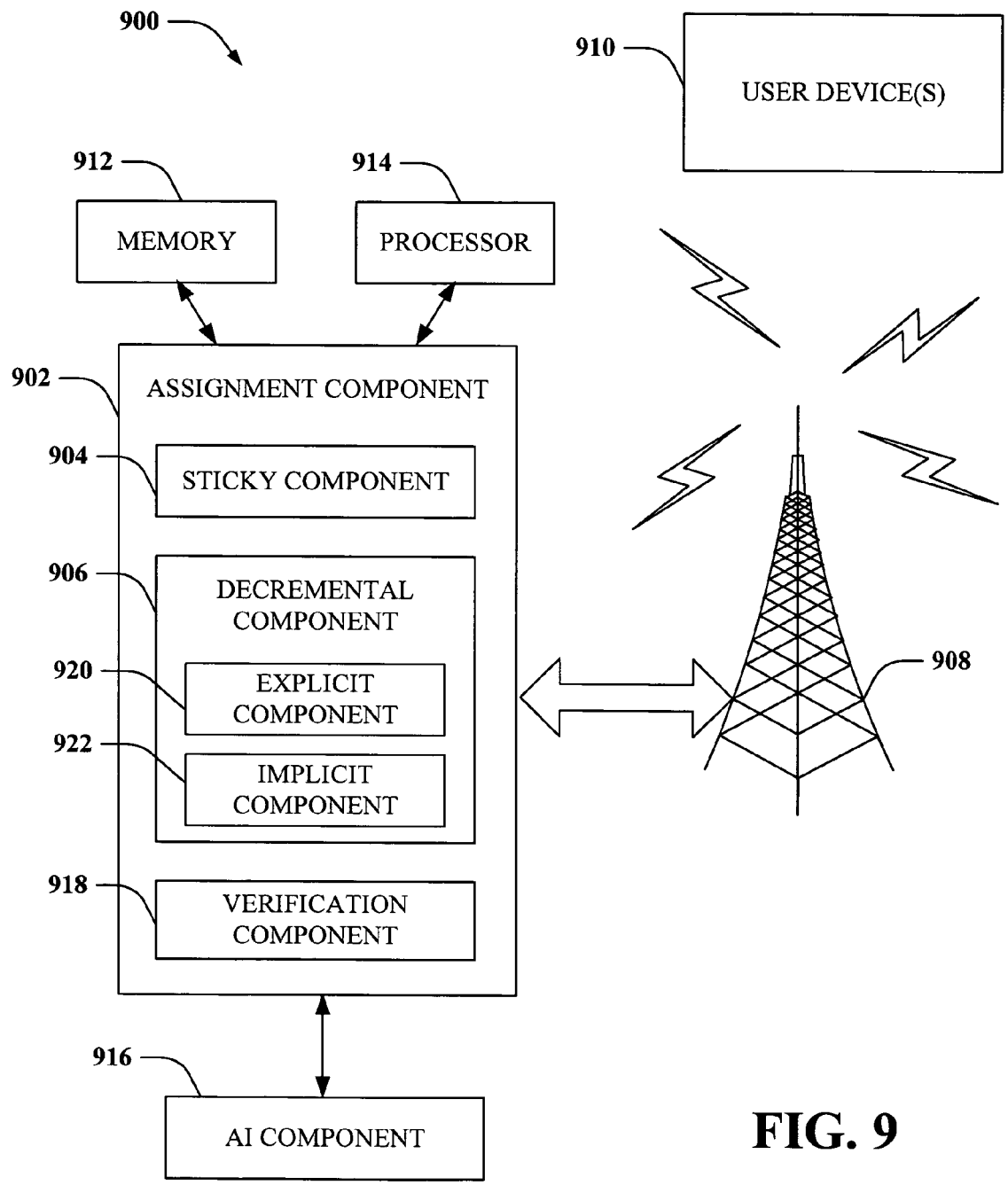
FIG. 9 is an illustration of a system that facilitates providing decremental assignments of system resources to users in a wireless network communication environment.

FIG. 9 is an illustration of a system 900 that facilitates providing decremental assignments of system resources to users in a wireless network communication environment. System 900 comprises an assignment component 902 that can generate resource assignments for users based on user needs, and such assignments can be transmitted through a base station 908 to an intended recipient user device (e.g., a mobile phone, a laptop, a PDA, . . . ). Assignment component 902 further comprises a sticky component 904 that can generate persistent resource assignments (e.g., assignments that are valid at user device 910 until further assignment information is received by user device 910), and a decremental component 906 that detects resource assignment conflicts and ensures that a conflicting assignment is receivable by both an intended user device and a conflicting user device to which the conflicting resource(s) was previously assigned. Additionally, assignment component 902 comprises a verification component 918 that can ensure that assignments received by user devices 901 are validated before they are decremented. Assignment component 902 is operatively coupled to a memory 912, a processor 914, and an AI component 916, each of which can be in bi-directional communication with the other as described with regard to previous figures.

Decremental component 906 additionally comprises each of an explicit decrementing component 920 and an implicit decrementing component 922. Explicit component 920 can facilitate generating a separate message for a user device having an extant assignment that is in conflict with a new assignment for another user device. An explicit decremental assignment can specify a portion of a user's existing assignment that should be excised from the existing assignment. For example, a first user can be assigned a set of resources such as transmission channels 1-3 (e.g., [1,3:0]). A subsequent assignment to a second user can comprise channels 3 and 4 (e.g., [3,2:0]). The preceding examples of resource assignments represent contiguous assignments, as indicated by the brackets "[]," wherein a first index number represents a first resource block and a second index number represents a length of a resource vector describing the number of resource blocks in the contiguous set. An indicator bit can be appended to such assignment messages to indicate whether the message is a standard assignment or an explicit decremental assignment. For instance, in the preceding examples of resource assignment messages, ":0" can indicate that the message is a standard assignment. Explicit decrementing component 920 can generate a decremental assignment message for transmission to the first user, whose assignment of resource block 3 is in conflict with the new assignment to the second user, such as [3,1:1], where the ":1" indicates that the assignment message is decremental. Additionally, such message can be represented in non-contiguous form as {3:1}, which in this example requires reduced transmission overhead because only one resource block is being decremented. The first user, upon receipt of the explicit decremental assignment, can relinquish its assignment to resource block 3, thus making it available for assignment to the second user per the new assignment message. In this manner, explicit component 920 can facilitate generation of an explicit decremental assignment message to ensure that such message is received by a conflicting user device, while maintaining transmission overhead costs in a relatively reduced state as compared to conventional systems that require complete new assignment messages for each device in conflict and/or complete deassignment of resources allocated to the less-recently assigned user device.

Implicit decrementing component 922 is illustrated to distinguish the functionality of explicit decrementing component 920, and can function in a manner similar to the description of decremental component 906 itself as described with regard to the preceding figures. For instance, upon generation of a new sticky assignment by sticky component 904, implicit component 922 can detect other devices whose assignments are in conflict with the new assignment and can ensure that such previously assigned conflicting devices are automatically decremented to make the conflicting resources available for reallocation to the second user under the new standard assignment. The new standard assignment and the explicit decremental assignment can be simultaneously transmitted to respective user devices without such devices being aware of each other's assignment message (e.g., in conjunction with a Unicast messaging structure, . . . ).

Figure 10:
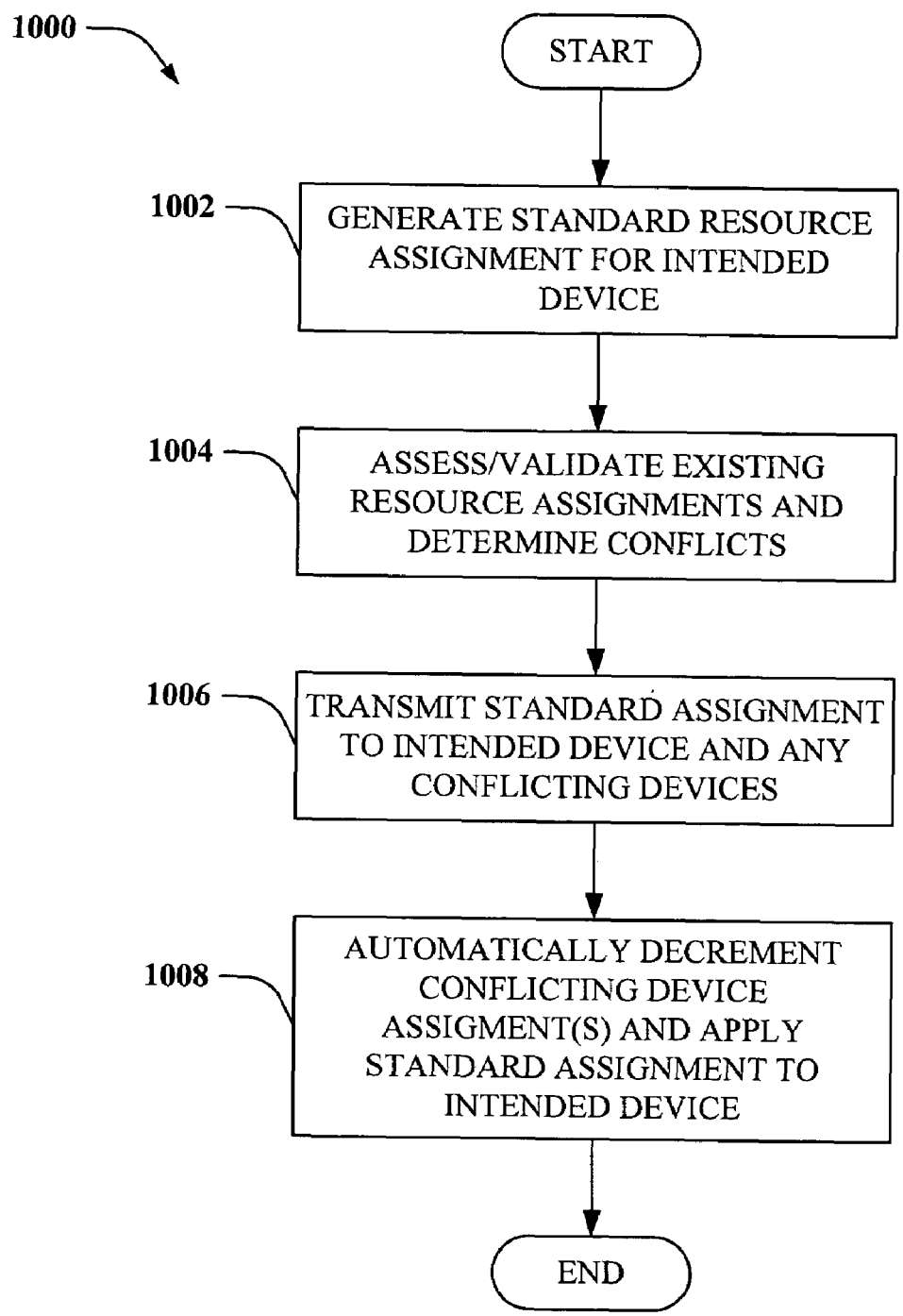
FIG. 10 illustrates a methodology for generating and providing decremental system resource assignments to users of a wireless network.
Figure 11:
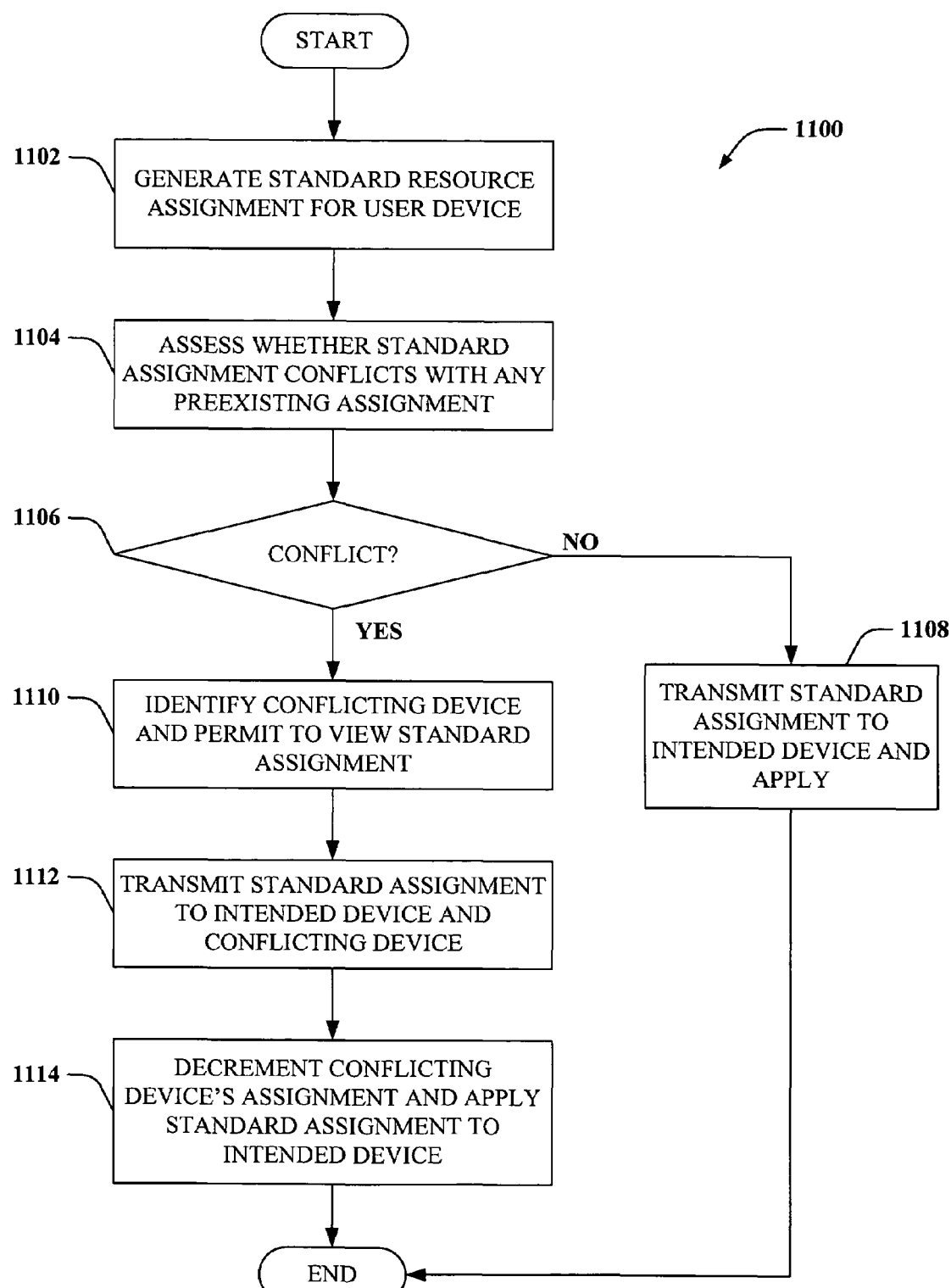
FIG. 11 is an illustration of a methodology for generating and transmitting implicit decremental assignments facilitate resource reorganization in a wireless network environment.
Figure 12:
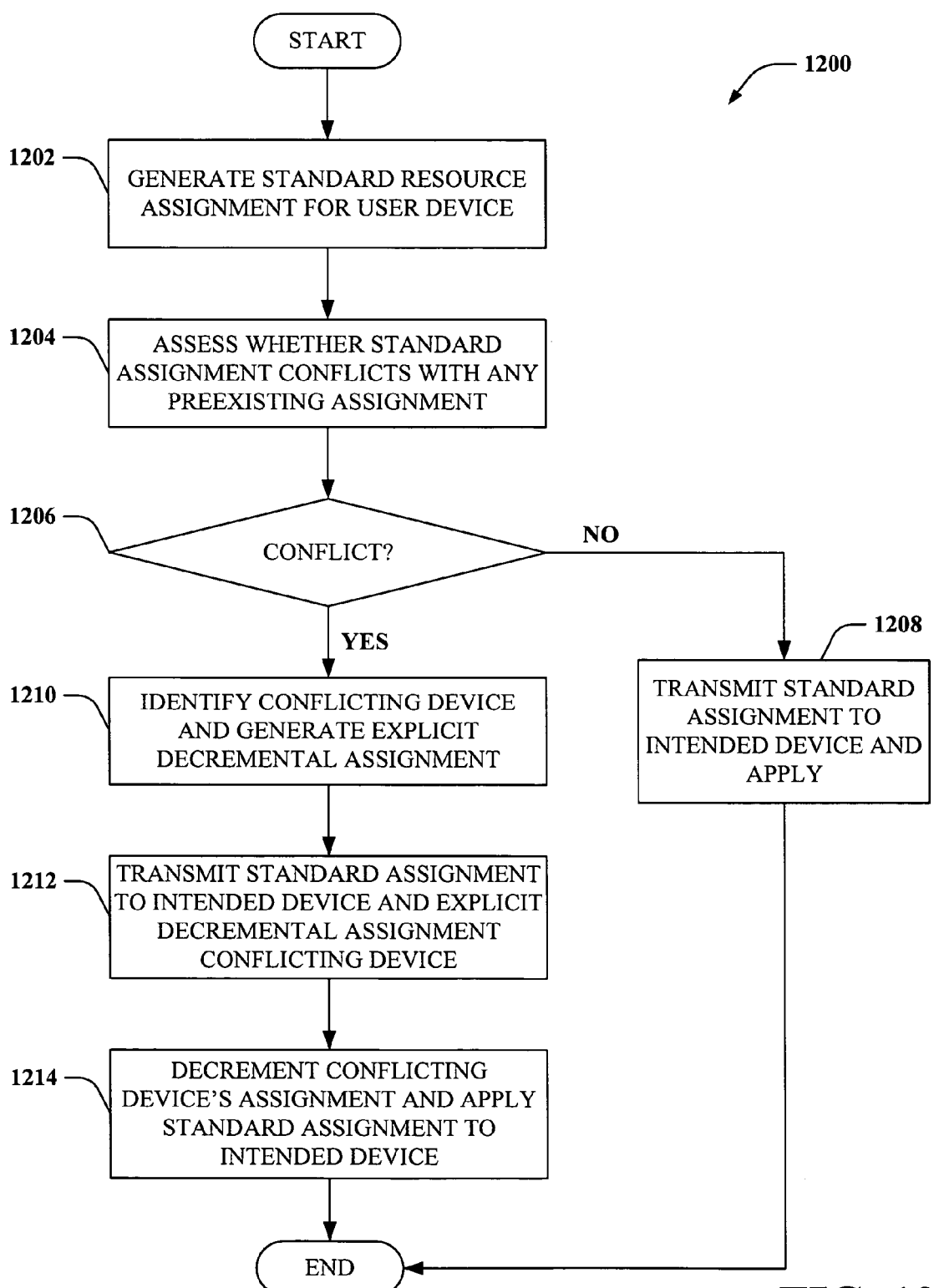
FIG. 12 illustrates a methodology for providing explicit decremental resource assignments to devices communication over a wireless network.

Referring to FIGS. 10-12, methodologies relating to generating supplemental system resource assignments are illustrated. For example, methodologies can relate to supplemental assignments in an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Referring now to FIG. 10, a methodology 1000 for generating and providing decremental system resource assignments to users of a wireless network is illustrated. At 1002, an standard resource assignment can be generated for an intended user device, such as a cellular phone, a laptop, a PDA, etc, whereby one or more resource blocks (e.g., frequencies time slots, channels, . . . ) can be allocated to the device. At 1004, resource allocation conflicts can be assessed. For example if the intended device assignment generated at 1002 comprises a resource set described by {1, 2, 3, 5:0} (e.g., where 1, 2, 3, and 5 represent non-contiguous assigned resources, as indicated by the soft brackets "{}", and the "0" bit following the colon designates the assignment as non-decremental), then resource blocks 1, and 3-5 can be assigned to the intended user device. At 1004, existing resource assignments (e.g., resources already assigned to other devices) can be assessed, which can include validation of such assignments. Assessment of resource assignment conflicts can yield, for instance, a conflict with regard to resource 3, such as a prior assignment to another user device (e.g., a conflicting device). According to this example the conflicting device can have a pre-existing assignment of [4, 5:0] (e.g., where 4 represents a starting resource block in a contiguous series as indicated by the hard brackets "[]", and 5 indicates a number of contiguous resource blocks), such that blocks 4-8 are subject to an extant assignment to the conflicting user device. Regardless of whether such a conflicting device is detected, the standard resource assignment can be transmitted to the intended device at 1006, as well as any detected conflicting devices. According to the example, the conflicting device assess/determined at 1004 can be permitted to view the assignment transmitted at 1006. At 1008, a conflicting device to which the standard assignment is transmitted, such as the conflicting device of the subject example, can automatically decrement its assigned resource set to excise resource block 5, which, once freed of its assignment to the conflicting user device, can be assigned to the intended user device. In this manner, the method 1000 can resolve assignment conflict and/or ambiguity in favor of a most recent assignment of a conflicted resource. In this case, the resulting assignment sets can be {1,2,3,5} for the intended device and {4,6,7,8} for conflicting device.

FIG. 11 is an illustration of a methodology 1100 for generating and transmitting implicit decremental assignments facilitate resource reorganization in a wireless network environment. At 1102, a standard resource assignment can be generated for an intended user device. At 1104, resource allocations can be assessed to identify potential conflicts between the resource assignment generated at 1102 and any pre-existing resource assignments. At 1106, the existence of a conflict can be verified. If no conflicting assignment is detected, then at 1108, the standard assignment can be transmitted to its intended user device and corresponding resource allocations can be applied to the device.

If it is determined at 1106 that a conflict is present (e.g., one or more resources identified in the standard assignment for the intended user device is subject to a pre-existing assignment to another user device), then at 1110 the conflicting device (e.g., one or more devices with a conflicting pre-existing assignment) can be identified and permitted to view the standard assignment upon transmission to facilitate conflict resolution with regard to one or more overlapping assignments. At 1112, the standard assignment can be transmitted to its intended user device as well as to any identified conflicting user devices, in order to permit the conflicting user device to view the assignment. Once the conflicting user device has viewed the new assignment to the intended device, the conflicting device can be aware of the specific resource(s) that are assigned to the intended device, and where such resource(s) has been previously assigned to the conflicting device, rights of assignment thereto can be relinquished by the conflicting device (e.g., the assignment of the conflicting device can be implicitly decremented) to make the overlapped resource available to the intended device per the new assignment at 1114.

FIG. 12 illustrates a methodology 1200 for providing explicit decremental resource assignments to devices communication over a wireless network. At 1202, a standard resource assignment can be generated for an intended user device (e.g., a user device initiating a communication session over the network, . . . ). For instance, a sticky assignment such as [1, 4:0] can be generated to assign resource blocks 1-4 to the intended user device. At 1204, pre-existing assignments to other devices (e.g., which can be validated is desired) can be assessed to identify potential conflicts and/or overlap between assigned resource blocks. Such conflicts can be verified at 1206. If no conflicts are determined to be present at 1206, then at 1208 the newly generated standard assignment can be transmitted to the intended device and resources assigned thereby can be allocated.

If a conflict is determined at 1206, then the conflicting device can be identified (e.g., by power signature, Unicast messaging ID mechanism, . . . ), and an explicit decremental assignment can be generated for the conflicting device at 1208. For example, the determination at 1206 can indicate that the conflicting device has a pre-existing assignment of {4, 5, 7:0} (e.g., resource block 4 overlaps, or conflicts, with the new resource assignment for the intended device generated at 1202). According to this example, an explicit decremental assignment for the conflicting device can be designed to decrement resource block 4 from the conflicting device's assignment in order to free block 4 for assignment to the intended device and resolve the conflict. For instance such an explicit decremental assignment can be represented as {4:1}, (e.g., where the 4 indicates the resource block to be decremented, and the ":1" represents a designator bit that identifies the assignment as an explicit decremental assignment). A designator bit with a value of "0" can indicate that the assignment is a standard assignment, while a value of "1" can indicate that the assignment is an explicit decremental assignment. It will be appreciated that the values of the designator bit can be inverted, so long as such values are consistently applied to denote each of the two possible statuses of an assignment message (e.g., standard and explicitly decremental). Moreover, designation of an assignment as such is not limited to employment of a designator bit, but rather can be effected using any suitable indicator(s) (e.g., a bit sequence, a message prefix, a flag in a message header, . . . ).

At 1212, the standard assignment can be transmitted to the intended device and the explicit decremental assignment can be transmitted to the conflicting device concurrently. The conflicting device need not be aware (e.g., need not be able to view) the standard assignment message in this case, because the explicit decremental assignment specifically (e.g., "explicitly") tells the conflicting device that the overlapping resource block is to be excise from the conflicting device's resource assignment list. Thus, upon receipt of the assignment messages by respective devices, the conflicting device can decrement its assignment to make the conflicting resource available (e.g., in this example, resource block 4), and the intended device can apply its received assignment as it is received in order to resolve any ambiguity or conflict between device resource allocation at 1214. In this manner, the method 1200 can provide resource assignment conflict resolution through decremental assignments while mitigating a need for multiple user devices to view a single assignment message. Additionally, utilization of explicit decremental assignment messages can mitigate a need for bulky retransmissions of complete assignments, such as are employed by conventional techniques.

Figure 13:
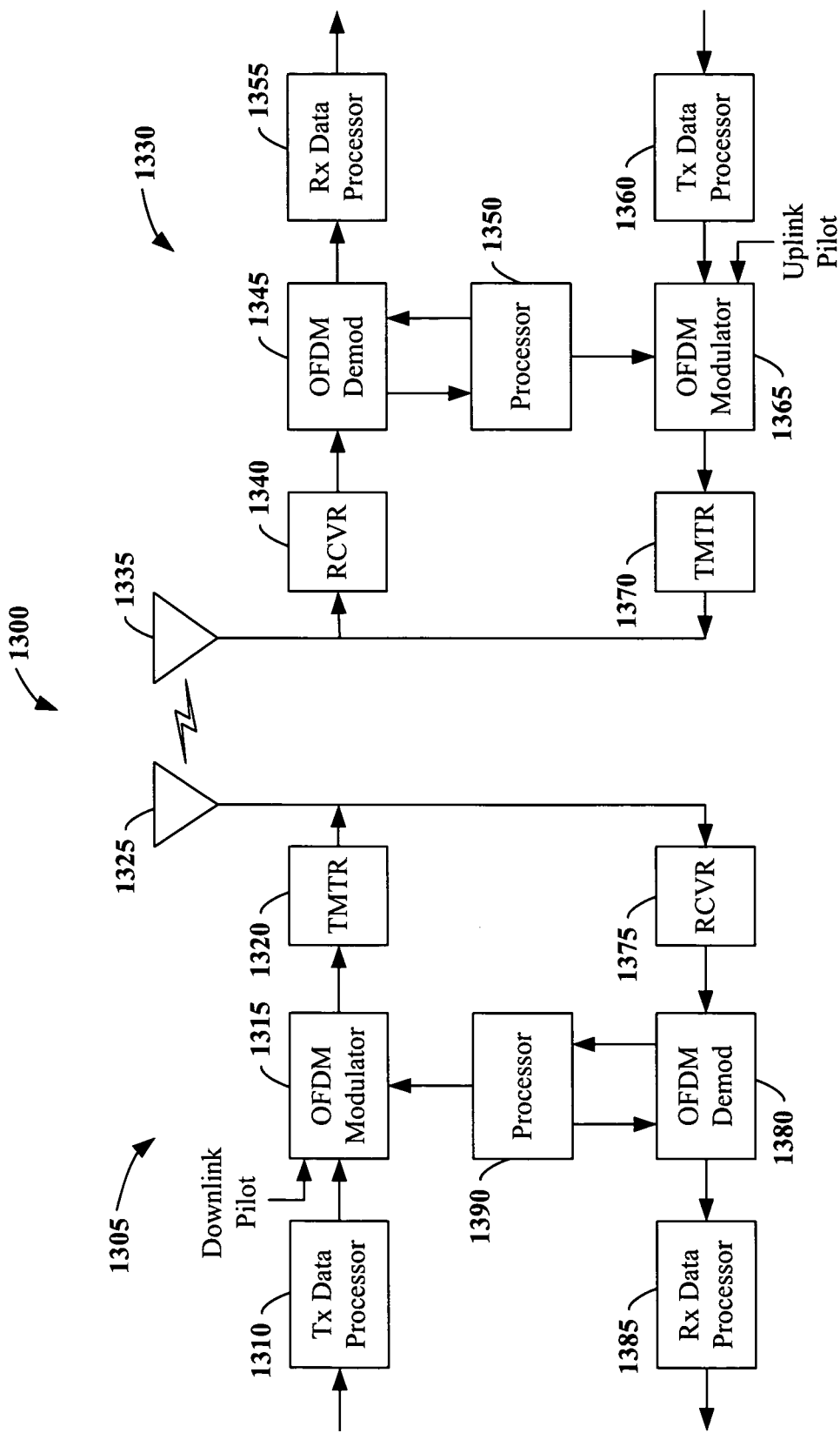
FIG. 13 is an illustration of a wireless network environment that can be employed in conjunction with the various systems and methods described herein.

FIG. 13 shows an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 5-9) and/or methods (FIGS. 9-12) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). An OFDM modulator 1315 receives and processes the data symbols and pilot symbols and provides a stream of OFDM symbols. An OFDM modulator 1320 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1320 can transform each set of N transmit symbols to the time domain using an N-point IFFT to obtain a "transformed" symbol that contains N time-domain chips. OFDM modulator 1320 typically repeats a portion of each transformed symbol to obtain a corresponding OFDM symbol. The repeated portion is known as a cyclic prefix and is used to combat delay spread in the wireless channel.

A transmitter unit (TMTR) 1320 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. An OFDM demodulator 1345 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1350 for channel estimation. OFDM demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by OFDM demodulator 1345 and RX data processor 1355 is complementary to the processing by OFDM modulator 1315 and TX data processor 1310, respectively, at access point 1300.

On the uplink, a TX data processor 1360 processes traffic data and provides data symbols. An OFDM modulator 1365 receives and multiplexes the data symbols with pilot symbols, performs OFDM modulation, and provides a stream of OFDM symbols. The pilot symbols may be transmitted on subbands that have been assigned to terminal 1330 for pilot transmission, where the number of pilot subbands for the uplink may be the same or different from the number of pilot subbands for the downlink. A transmitter unit 1370 then receives and processes the stream of OFDM symbols to generate an uplink signal, which is transmitted by the antenna 1335 to the access point 1310.

At access point 1310, the uplink signal from terminal 1330 is received by the antenna 1325 and processed by a receiver unit 1375 to obtain samples. An OFDM demodulator 1380 then processes the samples and provides received pilot symbols and data symbol estimates for the uplink. An RX data processor 1385 processes the data symbol estimates to recover the traffic data transmitted by terminal 1335. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1310 and terminal 1335, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that dynamically allocates wireless network resources, comprising:
    an assignment component that generates a first standard resource assignment for a first user device connected to a wireless network and at least a second standard resource assignment for at least a second user device connected to the wireless network;
    a transmitter that sends the first standard resource assignment to the first user device to give the first user control of resources defined in the first standard resource assignment;
    the assignment component determines whether at least one resource is common to each of the first and second standard assignments prior to transmitting the second assignment to the second user device;
    the assignment component directs the transmitter to transmit the second assignment to both the first and second user devices device, wherein the transmission of the second assignment is also readable by the first user device when at least one commonly assigned resource is determined to exist; and
    when at least one commonly assigned resource is determined to exist, the first user device removes the commonly assigned resource from its assignment upon reading the second standard assignment.

2. The apparatus of claim 1, wherein the assignment component directs the transmitter to transmit the second assignment only to the second user device when no commonly assigned resource is determined to exist.

3. The apparatus of claim 1, wherein the first user device automatically removes the commonly assigned resource from its assignment upon reading the second standard assignment, which acts as an implicit decremental assignment of the at least one commonly assigned resource for the first user device.

4. The apparatus of claim 1, wherein the first user device automatically removes all resources from its resource assignment upon reading the second standard assignment and determining that at least one resource is commonly assigned.

5. The apparatus of claim 1, further comprising a decremental assignment component that generates an explicit decremental assignment upon the determination that at least one commonly assigned resource is present in the first and second standard assignments.

6. The apparatus of claim 5, wherein the decremental assignment component provides a designation that distinguishes the explicit decremental assignment from a standard resource assignment.

7. The apparatus of claim 6, wherein the designation is an indicator bit that can be set to a "1" or a "0" and appended to an assignment message.

8. The apparatus of claim 7, wherein the indicator bit is set to a "1" by the decremental assignment component to designate the assignment message as an explicit decremental assignment, and set to a "0" by the assignment component to designate the assignment message as a standard resource assignment.

9. The apparatus of claim 1, wherein at least one of the first and second user devices is a cellular telephone.

10. The apparatus of claim 1, wherein at least one of the first and second user devices is a laptop.

11. The apparatus of claim 1, wherein at least one of the first and second user devices is a personal digital assistant.

12. The apparatus of claim 1, wherein an assignment is retained by a user device until a subsequent assignment message is received that alters the assignment.

13. A method of dynamically assigning system resources in a wireless network environment, comprising:
    detecting a resource conflict between an existing resource assignment to a first user device and a new resource assignment for a second user device, wherein the detecting a resource conflict comprises comparing the new resource assignment to all existing resource assignments to determine at least one conflicting resource listed in both the new resource assignment and the existing resource assignment; and
    providing a decremental assignment to the first user device to decrement the existing resource assignment to resolve a detected resource conflict by transmitting the new resource assignment to the second user device, wherein the transmission of the new resource assignment is also readable by the first user device, wherein the first user device relinquishes control over at least one conflicting resource to make the at least one conflicting resource available for the second user device.

14. The method of claim 13, further comprising providing a decremental assignment to the first user comprises providing at least one of an implicit decremental assignment and an explicit decremental assignment.

15. The method of claim 14, further comprising providing an implicit decremental assignment comprises transmitting the new resource assignment to the first user device and permitting the first user device to view the new resource assignment.

16. The method of claim 15, wherein the first user device reads the new assignment message to identify the at least one conflicting resource and relinquishes control over the at least one conflicting resource to decrement its existing resource assignment and make the at least one conflicting resource available.

17. The method of claim 16, further comprising concurrently transmitting the new resource assignment message to the second user device, in addition to the first user device, the second user device is assigned all resources in the new assignment including at least resource relinquished by the first user device.

18. The method of claim 16, wherein the first user device relinquishes control of all resources in its existing resource assignment to make the at least one conflicting resource available.

19. The method of claim 14, further comprising generating and transmitting an explicit decremental assignment to the first user.

20. The method of claim 19, wherein the explicit decremental assignment comprises an indicator bit that identifies it as a decremental assignment.

21. The method of claim 20, further comprising identifying the at least one conflicting resource in the explicit decremental assignment.

22. The method of claim 21, wherein the first user device decodes the explicit decremental assignment and relinquishes assignment of the at least one conflicting resource defined therein.

23. The method of claim 22, further comprising transmitting the new assignment to the second user device.

24. The method of claim 22, further comprising providing a verification message from the first user device as to successful reception of the decremental assignment.

25. A resource assignment system, comprising:
an assignment component that generates persistent resource assignments for user devices in a wireless network environment and detects conflicts between resource assignments;
a transmitter that transmits resource assignments to user devices; and
a decremental assignment component that generates decremental assignments for at least one user device to resolve conflicts between assignments detected by the assignment component, wherein the decremental assignment component identifies a first user device with an existing resource assignment that conflicts with a new resource assignment for a second user device, wherein the transmitter transmits the new resource assignment to the second user device, wherein the new resource assignment is also readable by the first user device, wherein the first user device relinquishes relinquiishes control over a least one conflicting resource to make the at least one conflicting resource available for the second user device.

26. The system of claim 25, further comprising a verification component that receives a verification message from a user device that has received a resource assignment, the verification message indicates a successful receipt of the assignment message.

27. The system of claim 25, wherein the decremental assignment component ensures that the new resource assignment is transmitted to the first user device and the second user device, the new resource assignment is read by the first user device, and the first user device excises from its existing assignment any resources common to the new resource assignment.

28. The system of claim 25, wherein the decremental assignment component generates an explicit decremental assignment for the first user device.

29. The system of claim 28, wherein the explicit decremental assignment comprises a list of at least one resource common to both the existing resource assignment of the first user device and the new resource assignment for the second user device, and an indicator bit that identifies the explicit decremental assignment as a decremental assignment.

30. The system of claim 29, wherein the transmitter concurrently transmits the new resource assignment to the second user device and the explicit decremental assignment to the first user device.

31. The system of claim 30, wherein the first user device relinquishes assignment of any resources identified in the explicit decremental assignment message.

32. The system of claim 25, wherein a user device is a cellular phone.

33. The system of claim 25, wherein a resource is at least one of a communication channel, a communication frequency, and a transmission time slot.

34. A wireless network resource allocation apparatus, comprising:
means for detecting conflicting standard resource assignments that define at least one common resource, wherein the resource conflict comprises an existing assignment to a first device that conflicts with a standard assignment to a second device;
means for generating a decremental assignment that resolves detected conflicts between resource assignments, wherein resolving the detected conflicts is based on decrementing resources from the existing assignment making the conflicting resources available for the standard assignment; and
means for distinguishing the decremental assignment from standard resource assignments; and
means for providing the decremental assignment to the second device and decrementing the existing assignment to the first device upon reading the decremental assignment transmitted to the second device.

35. The apparatus of claim 34, further comprising means for verifying receipt of an assignment message by a user device.

36. The apparatus of claim 35, wherein the means for verifying receives an indication of receipt of a successful assignment decode over a reverse link to indicate successful receipt of a standard resource assignment.

37. The apparatus of claim 35, wherein the means for verifying receives an acknowledgement of a successful assignment decode over a forward link to indicate successful receipt of a standard resource assignment.

38. The apparatus of claim 34, wherein the means for distinguishing a decremental assignment appends an indicator bit to the decremental assignment.

39. The apparatus of claim 34, wherein the means for generating a decremental assignment generates at least one of an implicit decremental assignment and an explicit decremental assignment.

40. The apparatus of claim 39, wherein the implicit decremental assignment comprises the standard assignment for the second device that is concurrently transmitted to the first device and the second device when the existing assignment to the first device conflicts with the standard assignment for the second device.

41. The apparatus of claim 40, wherein the first device reads the standard assignment for the second device and decrements any conflicting resources from its existing assignment, making them available for assignment to the second device.

42. The apparatus of claim 39, wherein the explicit decremental assignment comprises an indication of resources to be decremented from the existing assignment to the first device.

43. The apparatus of claim 42, further comprising means for transmitting the explicit decremental assignment to the first device only, upon receipt of which the resources to be decremented are deassigned from the first device and made available for assignment to the second device.

44. A computer-readable medium that stores computer-executable instructions for:
  assessing resources assignments to a plurality of devices communicating over a wireless network;
  detecting a conflict between an existing resource assignment to a first device and an impending resource assignment to a second device; and
  providing a decremental assignment to resolve the conflict in favor of the impending resource assignment to the second device by decrementing the existing resource assignment to the first device upon reading the decremental assignment transmitted to the second device.

45. The computer-readable medium of claim 44, further comprising computer-executable instructions for permitting the first device to receive an assignment of a conflicting resource to the second device, the assignment to the second device acts as an implicit decremental assignment of the conflicting resource from the resource assignment to the first device.

46. The computer-readable medium of claim 44, further comprising computer-executable instructions for generating and transmitting an explicit decremental assignment for the first device, the explicit decremental assignment instructs the first device to relinquish the conflicting resource for assignment to the second device, while the first device retains the remainder of the resources assigned to the first device.

47. The computer-readable medium of claim 44, further comprising computer-executable instructions for identifying an explicit decremental assignment as a decremental assignment to distinguish a decremental assignment from a standard assignment.

48. The computer-readable medium of claim 44, further comprising computer-executable instructions for verifying receipt of a decremental assignment by a device.

49. A microprocessor that executes instructions for providing decremental resource assignments, the instructions comprising:
  determining whether a resource is subject to potentially conflicting assignments to devices in a wireless communication environment;
  providing a decremental assignment to a less recent assignee of a conflicting resource assignment, the less recent assignee having an assigmuent set, the decremental assignment instructs the less recent assignee to decrement its assignment set by the conflicting resource assignment while retaining the remainder of its assignment set; and
  assigning the conflicting resource to a more recent assignee of the conflicting resource upon reading the decremental assignment transmitted to the less recent assignee.

50. A mobile device that facilitates wireless communication over a network, comprising:
  a receiving component that receives a standard resource assignment;
  a processing component that exerts control over resources described in the standard resource assignment, identifies a subsequent decremental assignment received by the receiving component, and relinquishes control of at least one conflicting resource defined in the decremental assignment while retaining a remainder of resources assigned by the standard resource assignment upon reading the decremental assignment transmitted to another device.

51. The mobile device of claim 50, wherein the processing component relinquishes control over all resources assigned by the standard resource assignment upon identifying a decremental assignment received by the receiving component.

\* \* \* \* \*